United States Patent
Butcher et al.

(12)

(10) Patent No.: US 6,901,902 B1
(45) Date of Patent: Jun. 7, 2005

(54) TWO-PIECE VALVE STEM SEAL (75) Inventors: Tigree Milam Butcher, Cleveland, GA (US); Milton Loman Griswold, Clarkesville, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 3 days.

(21) Appl. No.: 10/786,769

(22) Filed: Feb. 25, 2004

(51) Int. Cl.[7] .................................................. F02N 3/00
(52) U.S. Cl. .................................................. 123/188.6
(58) Field of Search ...................................... 123/188.6

(56) References Cited

U.S. PATENT DOCUMENTS

| | | | | |
|---|---|---|---|---|
| 3,554,180 | A | * | 1/1971 | Lesser ...................... 123/188.6 |
| 3,554,562 | A | * | 1/1971 | Davis, Jr. ................... 277/502 |
| 4,909,202 | A | * | 3/1990 | Binford et al. ............. 123/188.6 |
| 4,947,811 | A | * | 8/1990 | Binford .................... 123/188.6 |
| 5,558,056 | A | * | 9/1996 | Sakata ..................... 123/188.6 |
| 5,775,284 | A | * | 7/1998 | Kirchner et al. ........... 123/188.6 |

* cited by examiner

Primary Examiner—Noah P. Kamen
(74) Attorney, Agent, or Firm—Ronald W. Wangerow (57) ABSTRACT

A two piece valve stem seal assembly including first and second generally cylindrical shells, one of which is partially axially nested or inserted within the other. The valve stem seal assembly also includes an engagement portion on the one of the shells for grippingly engaging the outer shell in order to substantially prevent or at least minimize the possibility of axial separation of the shells during subsequent assembly into an engine or other valve-containing device. The assembly may also optionally include a discontinuity on the one of the shells for axially retaining or axially interlocking the shells in order to substantially prevent or at least minimize such possibility of axial separation.

36 Claims, 10 Drawing Sheets

TWO-PIECE VALVE STEM SEAL

BACKGROUND OF THE INVENTION

The present invention relates to valve stem seals, and more particularly to a two-piece valve stem seal preferably for use in an internal combustion engine, but applicable to other valve stem sealing applications.

The primary function of a valve stem seal in an internal combustion engine, for example, is to allow adequate lubrication at the valve stem/valve guide interface while minimizing internal oil consumption. Valve stem seals of this general type are known in the prior art, as shown in U.S. Pat. Nos. 5,558,056; 4,947,811; 4,909,202; 3,554,562; and 3,554,180, for example. In addition, a two-piece valve stem seal of this general type is shown in U.S. Pat. No. 5,775,284, which is assigned to the same assignee as the present application and which has overlapping inventorship with the present invention.

A valve stem seal assembly generally includes a rigid shell structure and a seal body, with the assembly having a generally hollow interior adapted to receive a valve stem guide. Typically the shell structure supports the seal body, which surrounds the valve stem in order to essentially "meter" the provision of oil for lubricating the valve guide's inner diameter and the outer diameter of the valve stem. At the same time, however, the valve stem seal serves to minimize the amount of oil that can be drawn into the combustion chamber or pass to the engine's exhaust. If the rigid shell is not properly located in relation to the valve guide, the sealing element might not properly seat upon the valve stem thus causing non-uniform pressures at the cylinder and valve guide, undesirable wear patterns on the seal or valve stem and unpredictable lubrication of the valve stem and valve guide.

Some prior art valve stem seals have had histories of cracked flanges during vehicle operations due to shock waves and internal stresses at the flange portion of the valve stem seal. Some of such prior art valve stem seals also have not had sufficiently flat flange portions, thus further increasing the likelihood of flange cracking.

In addition some prior art two-piece valve stem seal assemblies have been difficult to assemble by their manufacturers, as well as presenting further difficulties to consequent manufacturers assembling the finished valve stem seal assembly into an engine or other device using such assemblies.

These problems sometimes have resulted from the need to assemble or insert the "upper" generally cylindrical shell portion of the valve stem seal assembly "upwardly" into the "lower" generally cylindrical shell portion from the "bottom" of the lower shell portion, i.e., from the end of the lower shell portion that bears against the engine's cylinder head or other such member of a device through which the valve stem extends. This difficulty sometimes results from the "upper", end portion of the lower shell portion having a relatively small bearing surface (against which the insertion forces are directed) when compared to the bearing surface at the lower end of the lower shell portion.

With regard to the consequent manufacturer's assembly of the finished valve stem seal assembly into an engine or other device, the vigorous nature of various automated parts feeding and assembling apparatus can sometimes cause two-piece valve stem seal assemblies to separate during such operations. This of course can cause malfunction, or at least temporarily halt or slow down, such consequent assembly operations.

Although the two-piece valve stem seal assembly described and claimed in the above-mentioned U.S. Pat. No. 5,775,284 performs well and successfully overcomes various short-comings of the prior art, the present invention seeks to further improve upon that design and overcome these and other disadvantages of the prior art.

Other objectives of the present invention are: to provide a valve stem seal which will offer greater resistance to the forces exerted by the valve spring which causes the flange to crack; to prevent the sealing member of the assembly from separating from the valve guide; and to provide a flanged valve stem seal that will not rotate about the valve guide due to the rotational motion of the valve spring, thus minimizing torsional stresses on the valve's return spring and reducing wear.

SUMMARY OF THE INVENTION

A two-piece valve stem seal assembly according to the present invention for use in a valve-containing device having a valve with a valve stem thereon (such as an internal combustion engine, for example) which is a variation upon and an improvement over that of U.S. Pat. No. 5,775,284, generally includes a generally hollow first cylindrical shell (so-called "upper" shell) having a radially inwardly extending flange adjacent an axially outer end of the first shell and a radially outwardly extending flange adjacent an axially inward end of the first shell, and a generally hollow second cylindrical shell (so-called "lower" shell) having a radially outwardly extending seat adjacent an axially outer end thereof and a generally axially-extending engagement portion adjacent an axially inward end thereof. A portion of said first shell extends axially within an inner surface of the second shell, with the axially-extending engagement portion of the first shell grippingly engaging a portion of an outer surface of the first shell in an interference fit therebetween.

A resilient sealing body is supported by the first shell, said resilient sealing body having an opening therethrough for receiving the valve stem in sealing contact therewith when the valve stem seal assembly is assembled into the engine or other valve-containing device. The second shell can also include second a radially inwardly-extending flange adjacent an axially inward end thereof and generally adjacent the axially-extending engagement portion (on either axial side thereof).

Preferably, the improved two-piece valve stem seal includes rigid cylindrical shells, preferably composed of a metal or metal-containing material. The resilient sealing body can be composed of rubber or other resilient elastomers and is preferably bonded directly to the preferred metal casing of the first cylindrical shell. This allows the sealing body in many embodiments to remain stationary with the first cylindrical shell thus reducing wear of the sealing body's seal lip and extending product life. Such bonded resilient seal body also allows for easier seal installation and removal, greater support of the sealing body's sealing lip and superior control of oil metering for lubrication of the valve stem.

Additional objects, advantages, and features of the present invention will become apparent from the following description and the appended claims, taken in conjunction with the accompanying drawings.

DETAILED DESCRIPTION OF THE PREFERRED EMBODIMENTS

FIGS. 1 through 12 illustrate various embodiments of a two-piece valve stem seal assembly according to U.S. Pat. No. 5,775,284 and according to the present invention. For purposes of example only, FIGS. 1 through 12 are primarily directed toward an internal combustion engine application. It should be noted, however, as will become apparent to those skilled in the art from the following description and claims, the principles of the present invention are equally applicable to other devices having valves with valve stems thereon.

Referring initially to FIGS. 1 through 4, a two-piece valve stem seal assembly 10 preferably has a two-piece construction, including a first generally rigid cylindrical shell 14, preferably made of a metal-containing material, but which may be made of ceramic or other relatively hard and rigid materials. Although the first shell 14 is preferably generally hollow and cylindrical in shape, other shapes may be used depending on the needs of the specific application for the valve stem seal assembly.

The valve stem seal assembly 10 also includes a resilient sealing member or body 18 that is preferably directly bonded to the rigid cylindrical shell 14. The inner surface of the first shell 14 engages the exterior surface of a second generally rigid shell 16. The second shell 16 is also of a metal-containing material, but which may be made of ceramic or other relatively hard and rigid materials. Although the second shell 16, like the first shell 14, is preferably generally hollow and cylindrical in shape, other shapes may be used depending on the needs of the specific application for the valve stem seal assembly. The resilient sealing body 18 is preferably made of rubber or a rubber-containing material but may alternately be composed of other resilient elastomers or plastic materials capable of seal in the given environment.

In the preferred embodiments shown in FIGS. 1 through 4, the cylindrical shell 14 has an interference fit with the second cylindrical shell 16. However, other types of connection or bonding may be used, such as welding, direct forging, for example, any other type of bonding or connecting means available. The rigid cylindrical shell 14 includes an inwardly extending end wall 20 and an outwardly projecting flange 22 at an inward or "lower" end thereof. The rigid cylindrical shell 14 preferably also includes an outward step 44 on an inner surface of the shell 14.

The resilient sealing body 18 is preferably directly molded to the end wall 20 of the rigid cylindrical shell 14 and may be molded to the end wall 20 such that it completely surrounds the end wall 20. However, other variations may be used for connecting the sealing body 18 to the rigid cylindrical shell 14, such as by an interference fit, adhesives, epoxies or other known connections capable of creating a relatively fixed joint between the cylindrical shell 14 and the resilient sealing body 18. A rubber or other resilient elastomeric pad 28 (which can be integral with the sealing body 18) is also molded onto the interior wall of the rigid cylindrical shell 14 and is in contact with the valve guide 24 upon installation in an automotive cylinder head (or engine block assembly portion) 26. The preferred interference fit between the first cylindrical shell 14 and the second cylindrical shell 16 creates a retaining force to urge the rubber pad 28 into constant contact with the valve guide assembly 24.

The resilient sealing body 18 also preferably includes an annular sealing lip 38 at an "upper" or axially outer portion to seal with the valve stem 40 during engine operation. The resilient sealing body 18 also includes a concave groove 42 along an upper portion for receiving and retaining a spring member 12 (preferably a garter spring). The spring member 12 resiliently urges the resilient annular sealing lip 38 toward its contact with the valve stem 40 during engine operation. This spring member 12 and the annular sealing lip 38 function to control the amount of oil passing between the valve stem 40 and the valve stem seal assembly 10.

A "vertical" or axially-extending wall 30 of the second cylindrical shell 16 eliminates, or at least substantially minimizes, the possibility of the sealing body 18 of the valve stem assembly 10 separating from the valve guide 24 during operation of the vehicle. The second cylindrical shell 16 also includes a radially inwardly-extending flange 34 adjacent its axially inner or "upper" end and a radially outwardly-extending flange or seat 36 adjacent its axially outer or "lower" end. The second shell 16 thus provides a barrier of protection which protects the valve spring 32 from wearing against the cylinder head 26 during engine operation.

The second cylindrical shell 16 is manufactured separately from the first cylindrical shell 14, thus making it possible to reduce the occurrence of internal stresses in the second cylindrical shell 16. This also allows the second cylindrical shell's flange or seat 36 to have a flatness that can be more accurately controlled, which in turn will reduce the frequency of flange cracking. However, after such initial separate manufacturing operations, the second shell 16 is typically inserted axially "upwardly" into the interior of the first shell 14 from the first shell 14's axially inner end adjacent the flange or seat 36, which results in insertion forces being directed toward and against the axially outer (or "upper") end of the first shell 14 rather from the more substantial flange or seat 36, which has a greater load-bearing surface, if the insertion direction could be reversed, as in the embodiments of the present invention shown in FIGS. 5 through 12, discussed below.

Prior valve stem seal assembles were forcibly rotated by action of the valve spring 32 during engine operation, which would subject the sealing lip 38 to torsional stresses, as well as axial forces from the reciprocating valve stem 40. However, with the preferred embodiments of the valve stem seal assembly 10 shown in FIGS. 1 through 4, the cylindrical shells 14 and 16 are rotationally separate, thus allowing the second rigid cylindrical shell 16 to rotate with the valve spring 12 separately from the first cylindrical shell 14, leaving the sealing member or body 18 being rotationally stationary relative to the valve stem 40. This in turn reduces wear of the seal lip 38, extends the sealing life of the valve stem seal assembly 10, and provides greater control of oil metering throughout the life of the valve stem seal assembly 10. Such rotational separation of the first cylindrical shell 14 relative to the second cylindrical shell 16 typically occurs only during engine operation.

Referring to FIGS. 5 through 12, which depict exemplary embodiments of the present invention, which in turn provide further improved ease of manufacture of the valve stem seal assemblies 110 through 810, respectively, as well as reduced tendency for their respective shells to become axially separated during the assembly of the finished valve stem seal assemblies by the engine manufacturer. In FIGS. 5 through 12, many (if not most) of the respective elements are similar to, or correspond with, elements of the valve stem seal assembly of FIGS. 1 through 4. Therefore, such similar or corresponding elements of FIGS. 5 through 12 are designated by reference numerals that are similar to those of FIGS. 1 through 4, but that have 100 through 800 prefixes, respectively.

Figures 1, 2:
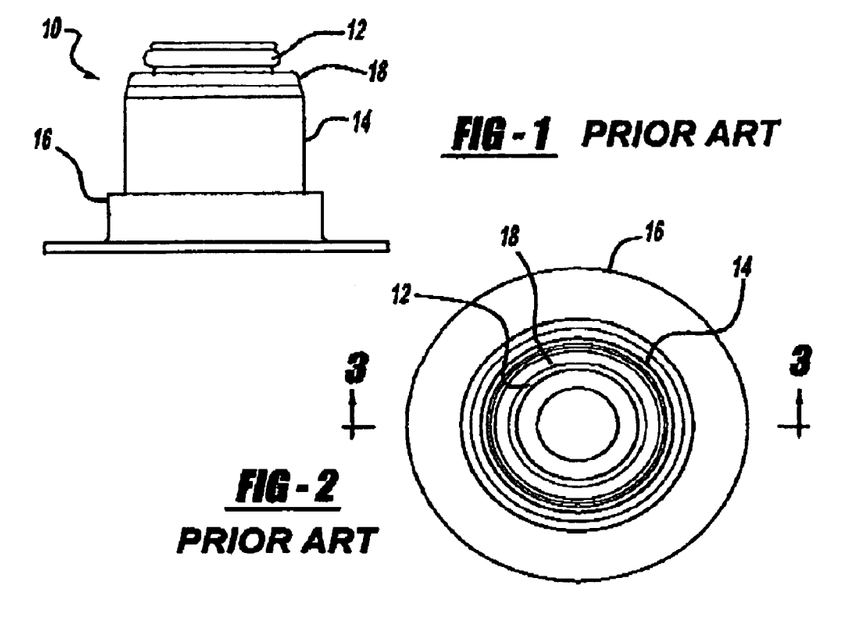
FIG. 1 is a side view of a two-piece valve stem seal assembly according to the invention of the above-mentioned U.S. Pat. No. 5,775,284.
FIG. 2 is a top view of a two-piece valve stem seal assembly of FIG. 1.
Figure 3:
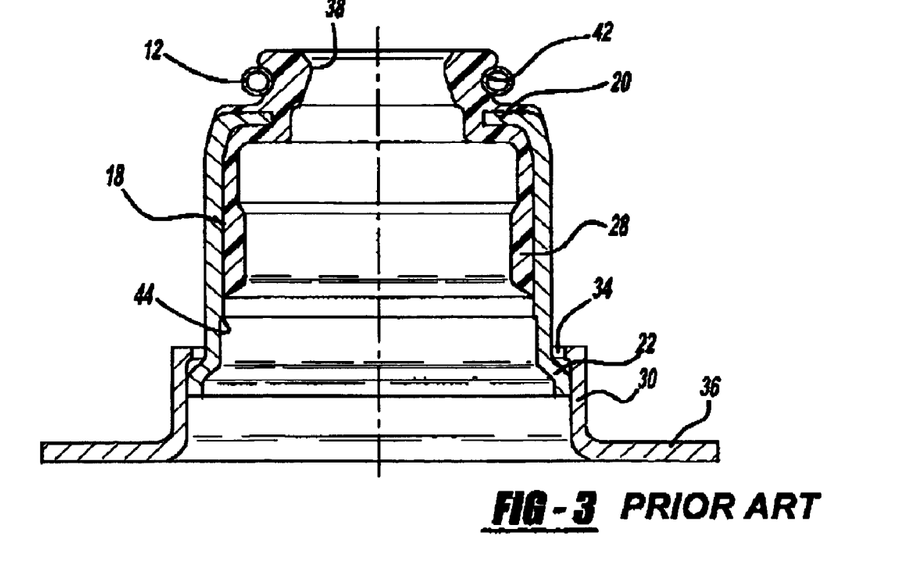
FIG. 3 is a cross-sectional view of the valve stem seal assembly of FIGS. 1 and 2, taken along line 3—3 of FIG. 2.
Figure 4:
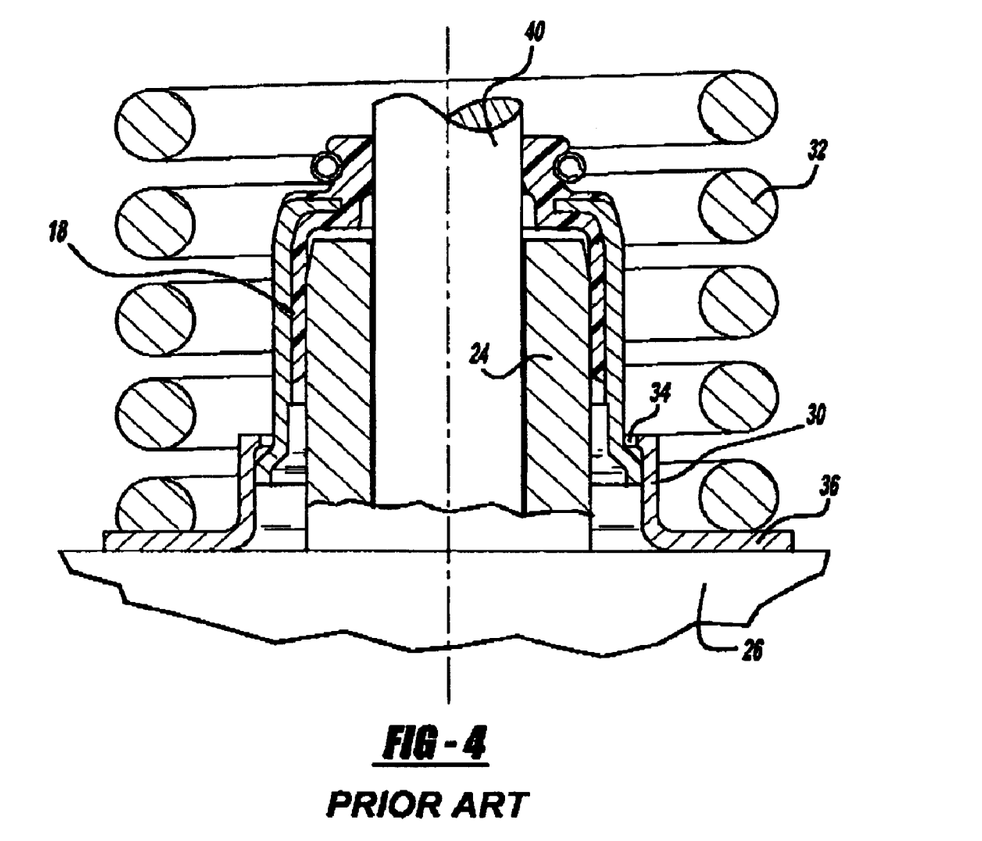
FIG. 4 is a cross-sectional view of the valve stem seal assembly similar to that of FIG. 3, but illustrating the valve stem seal assembly of FIGS. 1 through 3 installed or assembled into an exemplary device, such as an internal combustion engine.
Figure 5:
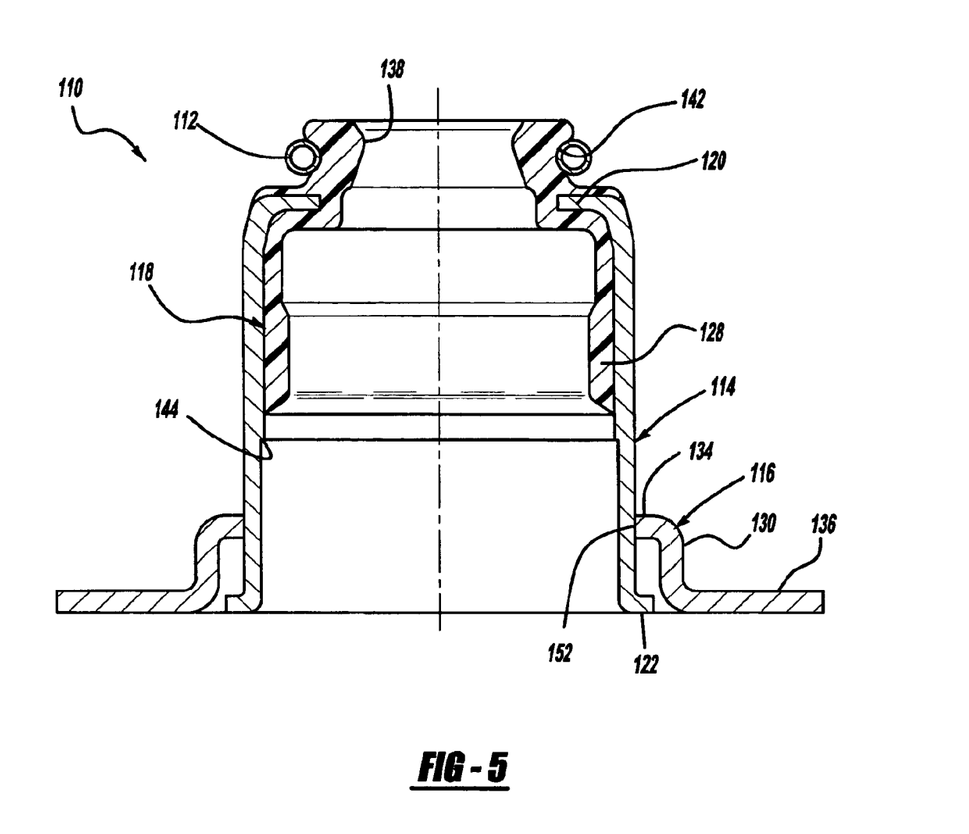
FIGS. 5 through 11 are cross-sectional views similar to that of FIG. 3, but illustrating various alternate embodiments of a two-piece valve stem seal assembly according to the present invention, wherein the first cylindrical ("lower") shell includes both a radially inwardly-extending flange and an axially-extending engagement portion generally adjacent the axially inward ("upper") end thereof.

In FIG. 5, the second ("lower") generally rigid cylindrical shell 116 has a radially outwardly-extending flange or seat portion 136 adjacent its axially outward ("lower") end and a radially inwardly-extending flange 134 adjacent its "upper" or axially inward end, as does that of the valve stem seal 10 in FIGS. 1 through 4, discussed above. However, the second shell 116 also includes a generally axially-extending, or axially-directed, engagement portion 152 that substantially and preferably grippingly engages the radially outer surface of the first ("upper") generally rigid cylindrical first shell 114.

In various applications of the present invention, this gripping engagement of the engagement portion 152 (or other engagement portions in other embodiments) with the first shell 114 (or other first shells in other embodiments) may or may not be so close or tight that it prevents the first and second shells 114 and 116 from being rotatable with respect to each other, as discussed above in connection with FIGS. 1 through 4. In applications where such relative rotation is substantially prevented, the material and wear characteristics of the flange or seat 136 should be selected to be capable of withstanding the tendency of the valve spring 40 (see FIG. 4) to rotate against a substantially stationary flange or seat 136 (or other such seats in other embodiments) of the second shell 116.

Because of the interference fit between the radially outwardly-extending flange 122 adjacent the axially inward ("lower") end of the first shell 114 and the axially inwardly-extending flange 134 (with the engagement portion 152 thereon), and because of the gripping engagement of the engagement portion 152, the valve stem seal assembly 110 eliminates or at least substantially minimizes any tendency for the first and second shells 114 and 116 to become axially separated or disengaged from each other (either partially or completely) during assembly of the finished valve stem seal assembly 110 into an engine or other valve and valve stem-containing device. Regardless of this interference fit, however, the first shell 114 can be inserted axially "downwardly" from the axially inward end of the second shell 116 during assembly of the two components, which allows the flange or seat 136 to act as a load-bearing structure during such insertion, thus substantially eliminating the possibility of damage to either component during such assembly. It should be noted that both of these advantages are provided by any of the various exemplary embodiments of the present invention illustrated in FIGS. 5 through 12, or in any other embodiment having any combination of the various features shown in FIGS. 5 through 12.

Figure 6:
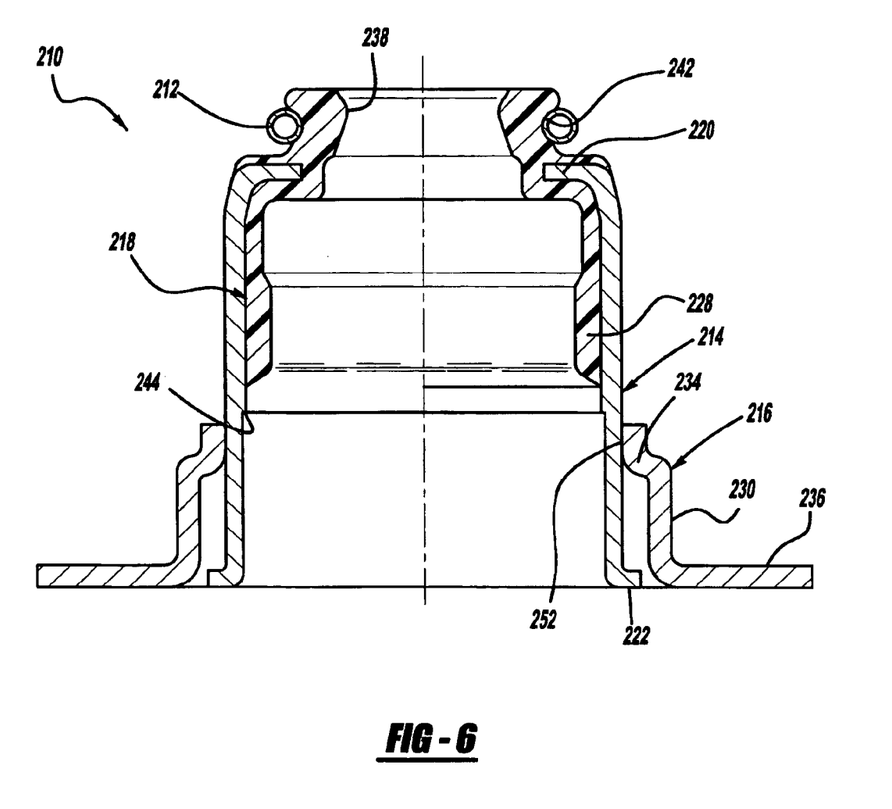
Figure 7:
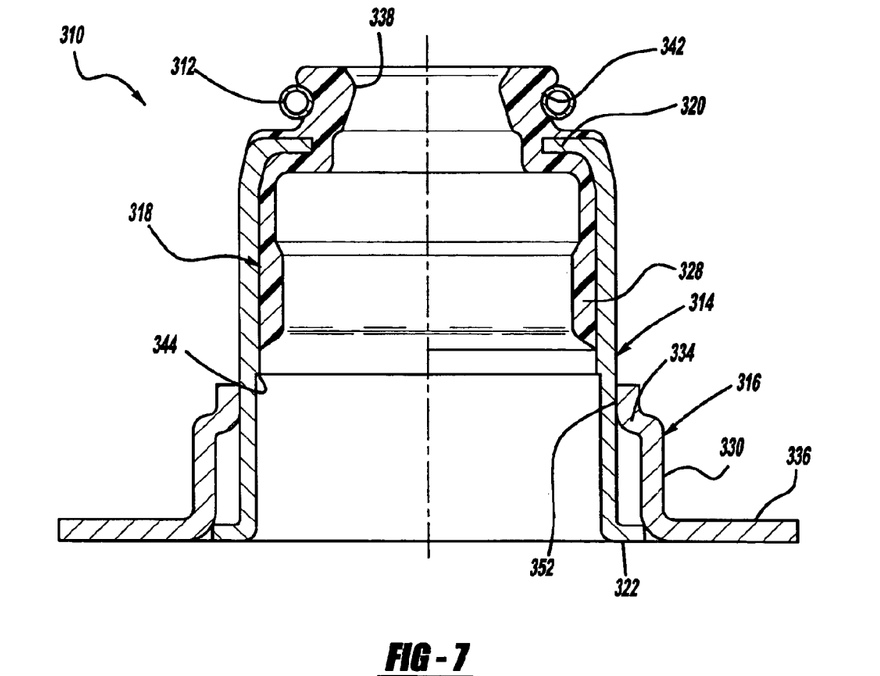
Figure 8:
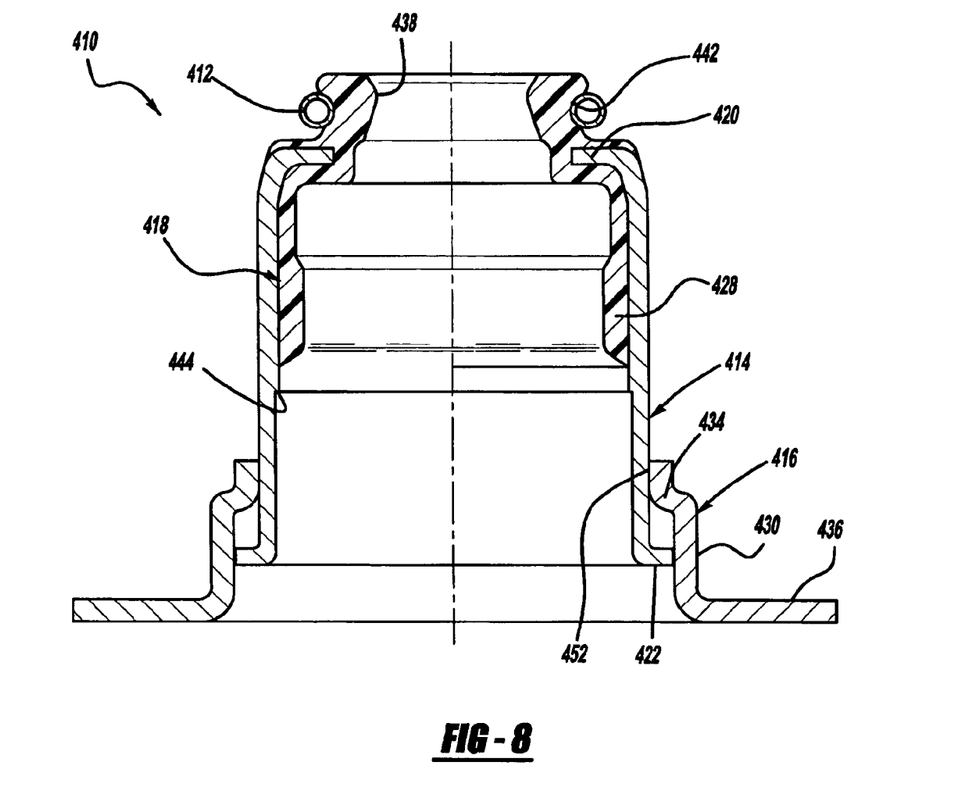

In FIGS. 6 through 8, the engagement portions 252, 352 and 452, respectively, are similar to engagement portion 152 of FIG. 5, except that they are axially elongated to provide greater engagement with their respective first shells 214, 314, and 414. As shown in FIG. 6, however, the radially inwardly-extending flange 222 can optionally be radially spaced from the interior surface of the second shell 216, if desired in a particular application his spaced relationship between the flange 222 and the second shell 216 can provide less resistance to the relatively rotational relationship between the first and second shells 114 and 116, while still providing the advantages discussed above in connection with FIG. 5.

Figure 9:
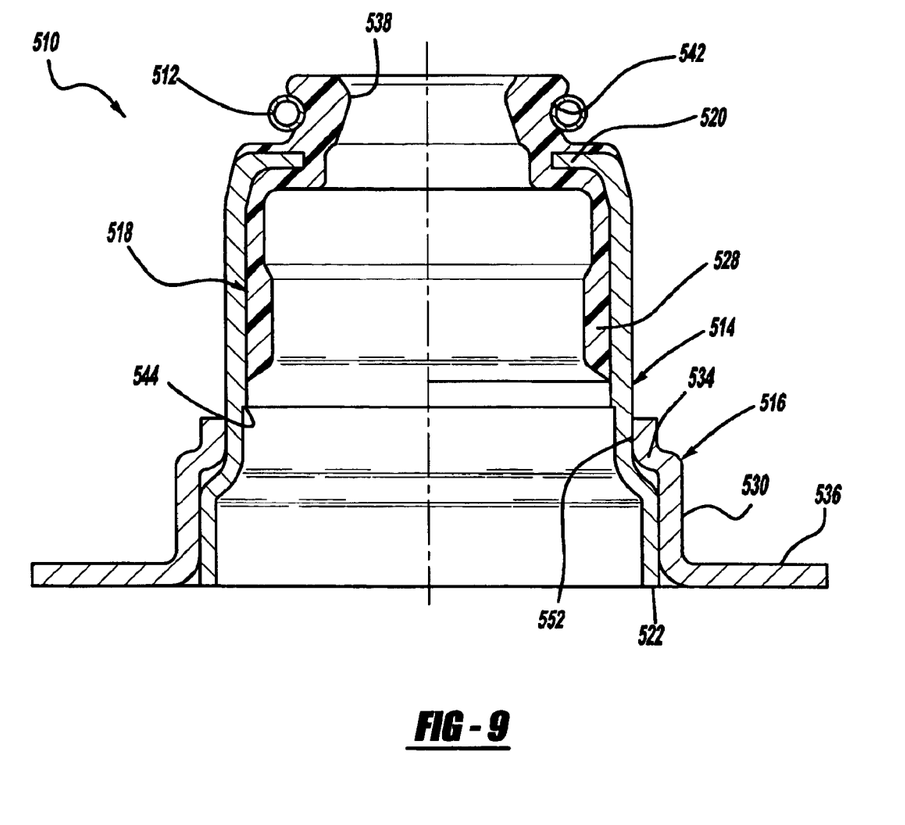

In FIG. 9, another alternate embodiment, namely valve stem seal 510, is shown. In this embodiment, the radially inwardly-extending flange adjacent the axially inner end of the first shell 514 is eliminated. This options greatly facilitates the insertion of the first shell 514 axially "downwardly" into the second shell 516, if deemed advantageous in a particular application, while still preserving the advantages of the other embodiments of the present invention.

Figure 10:
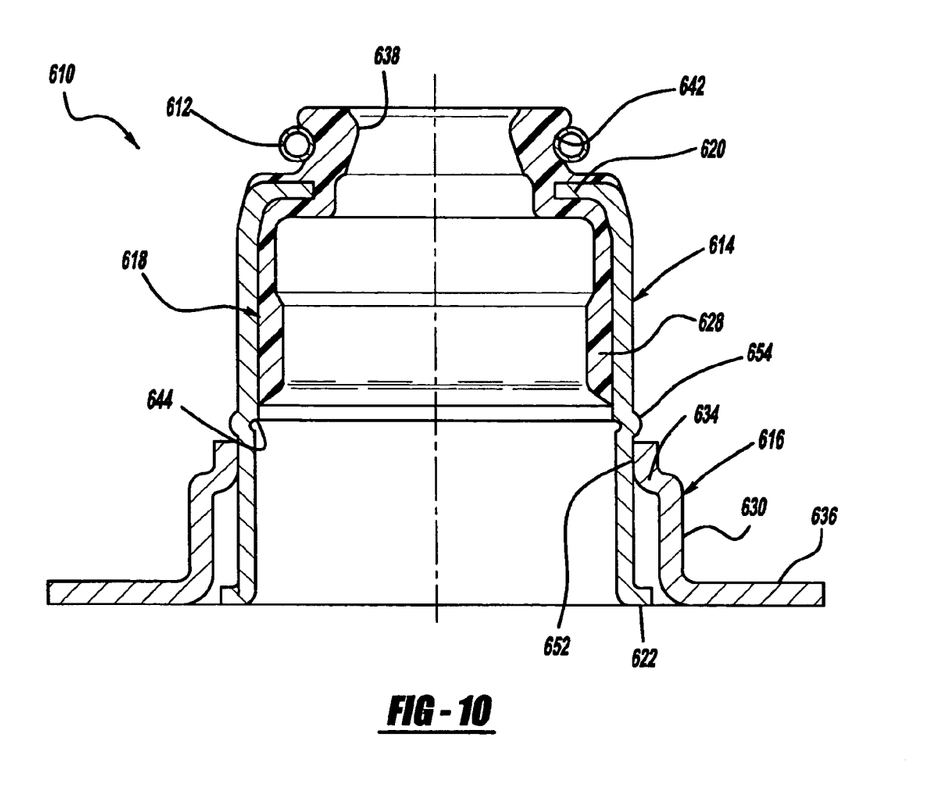
Figure 11:
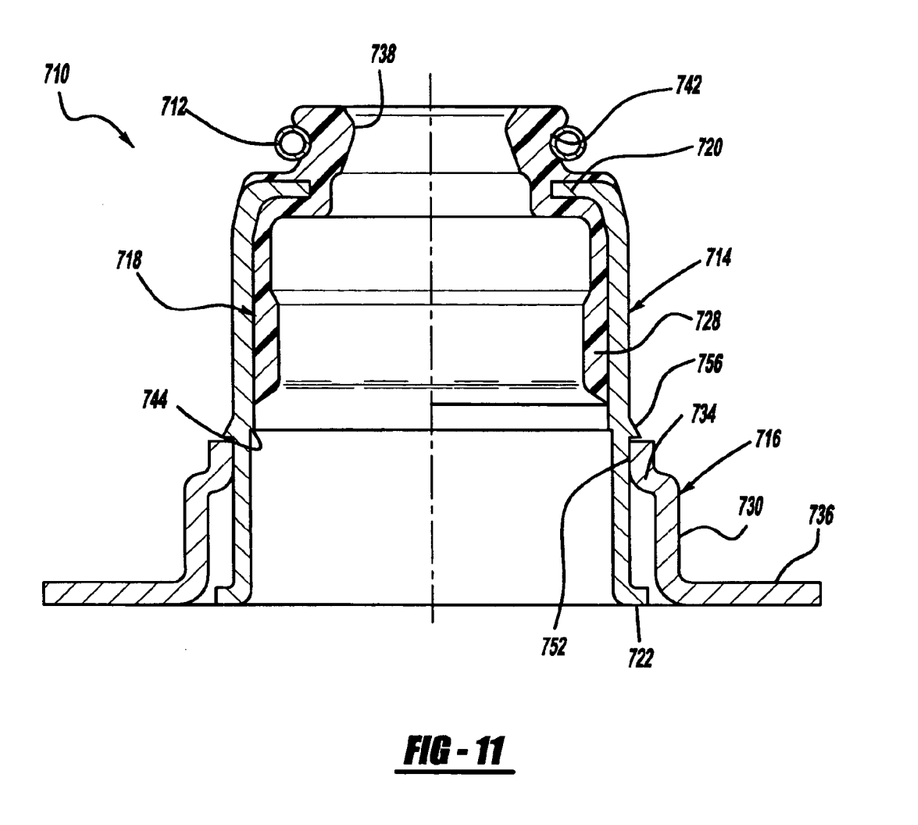

Valve stem seal assembly 610 of FIG. 10 is similar in function and advantages to the embodiments discussed above, but it further includes one or more staked portions 654 disposed on or about the periphery of the first shell 614. This staked portion (or portions) 654 further enhances the positive axial retention or interlock of the first and second shells 614 and 616 with respect to each other during assembly of the valve stem seal 610 into an engine or other valve and valve stem-containing device. A similar enhancement is achieved by the partially sheared portion 756 on the outer periphery of the first shell 714 in FIG. 11. Such partial shearing cut into the outer circumference of the first shell 714 causes an upset or other metal (or other material) flow in a generally radially outward direction to provide such axial retention or interlock. Although the staked portion 654 and the sheared or upset portion 756 are illustrated for purposes of example, in FIGS. 10 and 11, respectively, other types of discontinuities can be formed in the first shells of any embodiments of the invention to serve this axial retention or "interlock" between the first and second shells.

Figure 12:
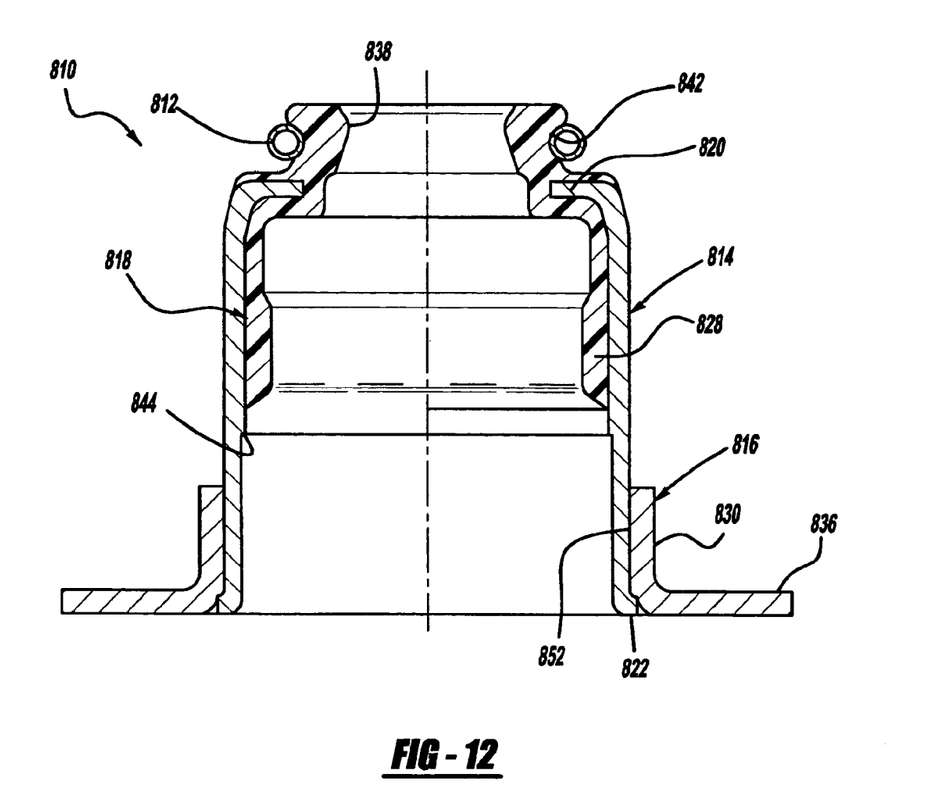
FIG. 12 is a cross-sectional view similar to that of FIGS. 5 through 11, but illustrating yet another alternate embodiment of a two-piece valve stem seal assembly according to the present invention, wherein the first cylindrical ("lower") shell includes only an axially-extending engagement portion generally adjacent the axially inward ("upper") end thereof.

In FIG. 12, another alternate embodiment, valve stem seal 810, is illustrated. In this embodiment, the above-discussed radially inwardly-extending flange adjacent the axially outer ("upper") end of the second shell 816 is eliminated, if feasible in a particular application. This further facilitates the ease of the interference-fit insertion of the first shell 814 "downwardly" into the second shell 816, while still substantially preserving most, if not all, of the advantages of the other exemplary embodiments of the present invention disclosed herein.

The foregoing discussion discloses and describes merely exemplary embodiments of the present invention for purposes of illustration only. One skilled in the art will readily recognize from such discussion, and from the accompanying drawings and claims, that various changes, modifications and variations can be made therein without departing from the spirit and scope of the invention as defined in the following claims.

What is claimed is:

1. A valve stem seal assembly for use in a valve-containing device having a valve with a valve stem thereon, said valve stem assembly including:

a generally hollow first cylindrical shell having a radially inwardly extending flange adjacent an axially outer end of said shell and a radially outwardly extending flange adjacent an axially inward end of said shell;

a generally hollow second cylindrical shell having a radially outwardly extending seat adjacent an axially outer end thereof and a radially inwardly extending flange adjacent an axially inward end thereof, a portion of said first shell extending axially within an inner surface of said second shell, said second shell further including a generally axially-extending engagement portion adjacent said second shell axially inward end, said axially-extending engagement portion engaging a portion of an outer surface of said first shell in an interference fit therebetween; and a resilient sealing body supported by said first shell, said resilient sealing body having an opening therethrough for receiving the valve stem in sealing contact therewith when said valve stem seal assembly is assembled into the valve-containing device.

2. A valve stem seal assembly according to claim 1, wherein said first rigid cylindrical shell is made of a metal-containing material.

3. A valve stem seal assembly according to claim 1, wherein said second rigid cylindrical shell is made of a metal-containing material.

4. A valve stem seal assembly according to claim 1, wherein said resilient sealing body is made of an elastomeric material.

5. A valve stem seal assembly according to claim 1, further including an annular sealing lip on a radially inner portion of said resilient sealing body.

6. A valve stem seal assembly according to claim 1, wherein said resilient seal body is fixedly interconnected with said first rigid cylindrical shell.

7. A valve stem seal assembly according to claim 1, wherein said first shell includes a discontinuity on its radially outer periphery, said discontinuity engaging and axially restraining said second shell.

8. A valve stem seal assembly according to claim 7, wherein said discontinuity includes a staked portion on its radially outer periphery, said staked portion engaging and axially restraining said second shell.

9. A valve stem seal assembly according to claim 7, wherein said discontinuity includes an upset portion on its radially outer periphery, said staked portion engaging and axially restraining said second shell.

10. A valve stem seal assembly for use in an internal combustion engine having a valve with a valve stem thereon, said valve stem assembly including:

a generally hollow first cylindrical shell having a radially inwardly extending flange adjacent an axially outer end of said shell and a radially outwardly extending flange adjacent an axially inward end of said shell;

a generally hollow second cylindrical shell having a radially outwardly extending seat adjacent an axially outer end thereof and a radially inwardly extending flange adjacent an axially inward end thereof, a portion of said first shell extending axially within an inner surface of said second shell, said second shell further including a generally axially-extending engagement portion adjacent said second shell axially inward end, said axially-extending engagement portion engaging a portion of an outer surface of said first shell in an interference fit therebetween; and a resilient sealing body supported by said first shell, said resilient sealing body having an opening therethrough for receiving the valve stem in sealing contact therewith when said valve stem seal assembly is assembled into the engine.

11. A valve stem seal assembly according to claim 10, wherein said first rigid cylindrical shell is made of a metal-containing material.

12. A valve stem seal assembly according to claim 10, wherein said second rigid cylindrical shell is made of a metal-containing material.

13. A valve stem seal assembly according to claim 10, wherein said resilient sealing body is made of an elastomeric material.

14. A valve stem seal assembly according to claim 10, further including an annular sealing lip on a radially inner portion of said resilient sealing body.

15. A valve stem seal assembly according to claim 10, wherein said resilient seal body is fixedly interconnected with said first rigid cylindrical shell.

16. A valve stem seal assembly according to claim 10, wherein said first shell includes a discontinuity on its radially outer periphery, said discontinuity engaging and axially restraining said second shell.

17. A valve stem seal assembly according to claim 16, wherein said discontinuity includes a staked portion on its radially outer periphery, said staked portion engaging and axially restraining said second shell.

18. A valve stem seal assembly according to claim 16, wherein said discontinuity includes an upset portion on its radially outer periphery, said staked portion engaging and axially restraining said second shell.

19. A valve stem seal assembly for use in a valve-containing device having a valve with a valve stem thereon, said valve stem assembly including:

a generally hollow first cylindrical shell having a radially inwardly extending flange adjacent an axially outer end of said shell and a radially outwardly extending flange adjacent an axially inward end of said shell;

a generally hollow second cylindrical shell having a radially outwardly extending seat adjacent an axially outer end thereof and a generally axially-extending engagement portion adjacent an axially inward end thereof, a portion of said first shell extending axially within an inner surface of said second shell, said axially-extending engagement portion engaging a portion of an outer surface of said first shell in an interference fit therebetween; and a resilient sealing body supported by said first shell, said resilient sealing body having an opening therethrough for receiving the valve stem in sealing contact therewith when said valve stem seal assembly is assembled into the valve-containing device.

20. A valve stem seal assembly according to claim 19, wherein said first rigid cylindrical shell is made of a metal-containing material.

21. A valve stem seal assembly according to claim 19, wherein said second rigid cylindrical shell is made of a metal-containing material.

22. A valve stem seal assembly according to claim 19, wherein said resilient sealing body is made of an elastomeric material.

23. A valve stem seal assembly according to claim 19, further including an annular sealing lip on a radially inner portion of said resilient sealing body.

24. A valve seal assembly according to claim 19, wherein said resilient seal body is fixedly interconnected with said first rigid cylindrical shell.

25. A valve stem seal assembly according to claim 19, wherein said first shell includes a discontinuity on its radially outer periphery, said discontinuity engaging and axially restraining said second shell.

26. A valve stem seal assembly according to claim 25, wherein said discontinuity includes a staked portion on its radially outer periphery, said staked portion engaging and axially restraining said second shell.

27. A valve stem seal assembly according to claim 25, wherein said discontinuity includes an upset portion on its radially outer periphery, said staked portion engaging and axially restraining said second shell.

28. A valve stem seal assembly for use in an internal combustion engine having a valve with a valve stem thereon, said valve stem assembly including:
- a generally hollow first cylindrical shell having a radially inwardly extending flange adjacent an axially outer end of said shell and a radially outwardly extending flange adjacent an axially inward end of said shell;
- a generally hollow second cylindrical shell having a radially outwardly extending seat adjacent an axially outer end thereof and a generally axially-extending engagement portion adjacent an axially inward end thereof, a portion of said first shell extending axially within an inner surface of said second shell, said axially-extending engagement portion engaging a portion of an outer surface of said first shell in an interference fit therebetween; and
- a resilient sealing body supported by said first shell, said resilient sealing body having an opening therethrough for receiving the valve stem in sealing contact therewith when said valve stem seal assembly is assembled into the engine.

29. A valve stem seal assembly according to claim 28, wherein said first rigid cylindrical shell is made of a metal-containing material.

30. A valve stem seal assembly according to claim 28, wherein said second rigid cylindrical shell is made of a metal-containing material.

31. A valve stem seal assembly according to claim 28, wherein said resilient sealing body is made of an elastomeric material.

32. A valve stem seal assembly according to claim 28, further including an annular sealing lip on a radially inner portion of said resilient sealing body.

33. A valve stem seal assembly according to claim 28, wherein said resilient seal body is fixedly interconnected with said first rigid cylindrical shell.

34. A valve stem seal assembly according to claim 28, wherein said first shell includes a discontinuity on its radially outer periphery, said discontinuity engaging and axially restraining said second shell.

35. A valve stem seal assembly according to claim 34, wherein said discontinuity includes a staked portion on its radially outer periphery, said staked portion engaging and axially restraining said second shell.

36. A valve stem seal assembly according to claim 34, wherein said discontinuity includes an upset portion on its radially outer periphery, said staked portion engaging and axially restraining said second shell.

* * * * *